United States Patent Office 3,395,731
Patented Aug. 6, 1968

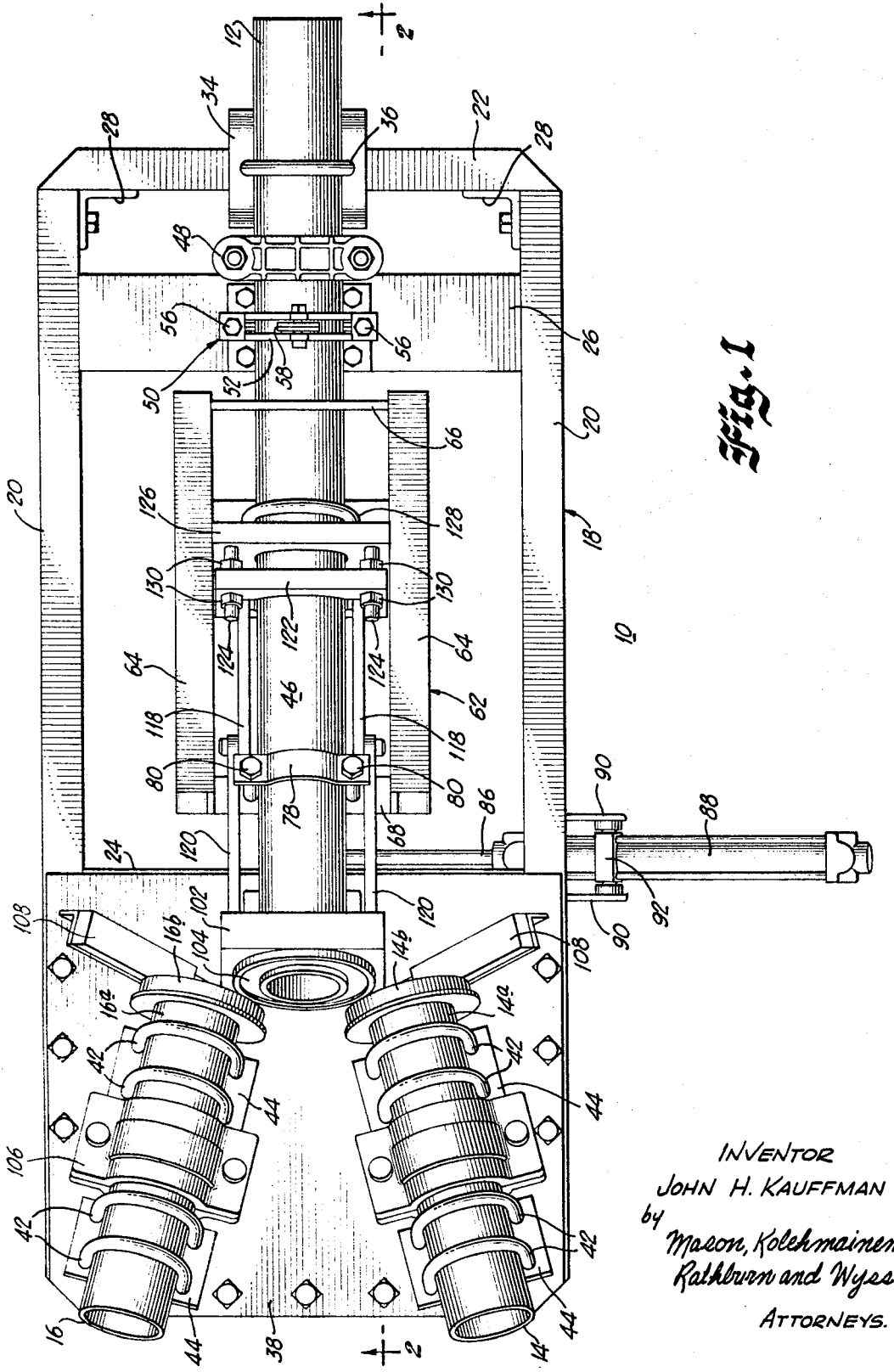

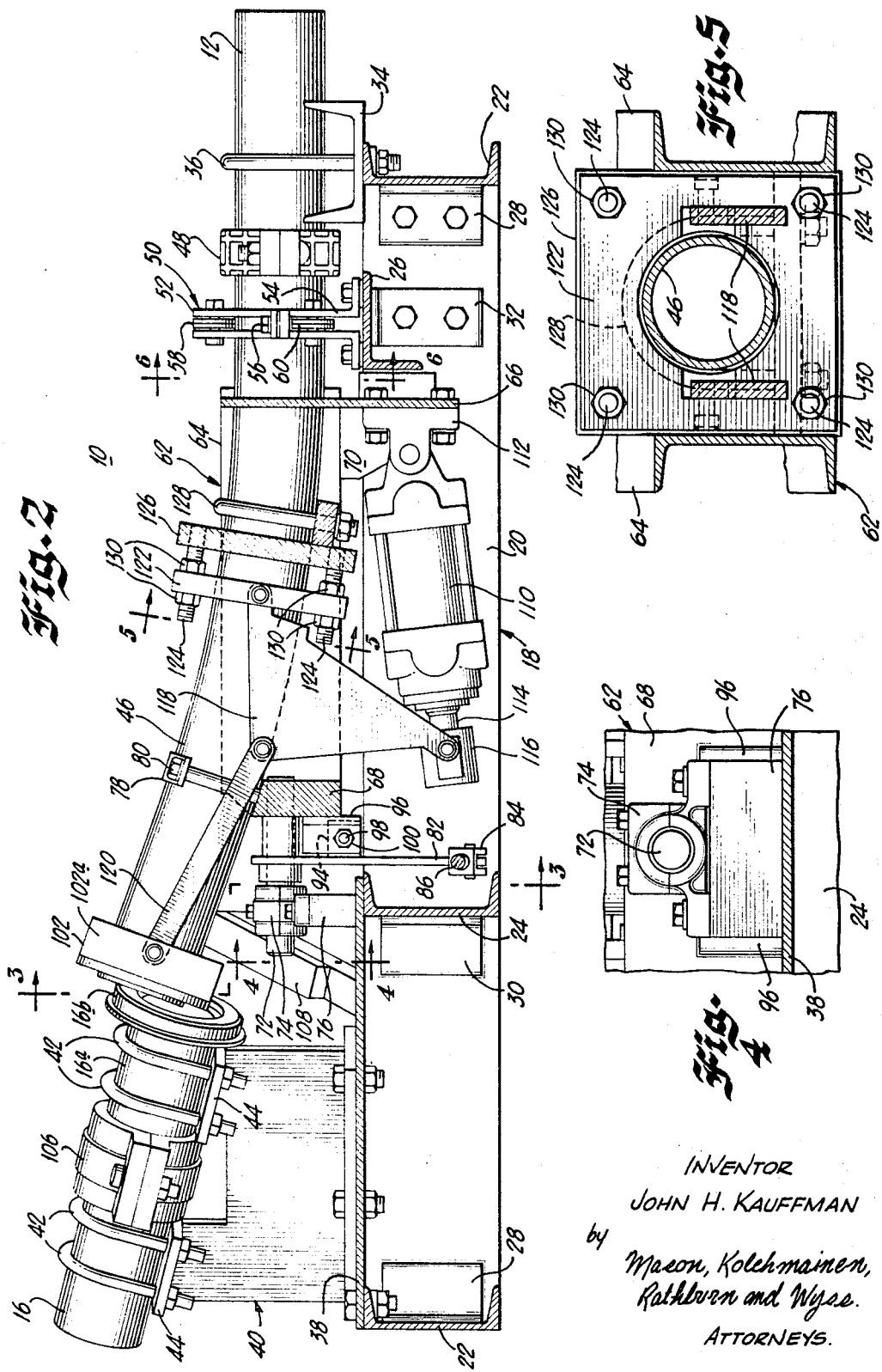

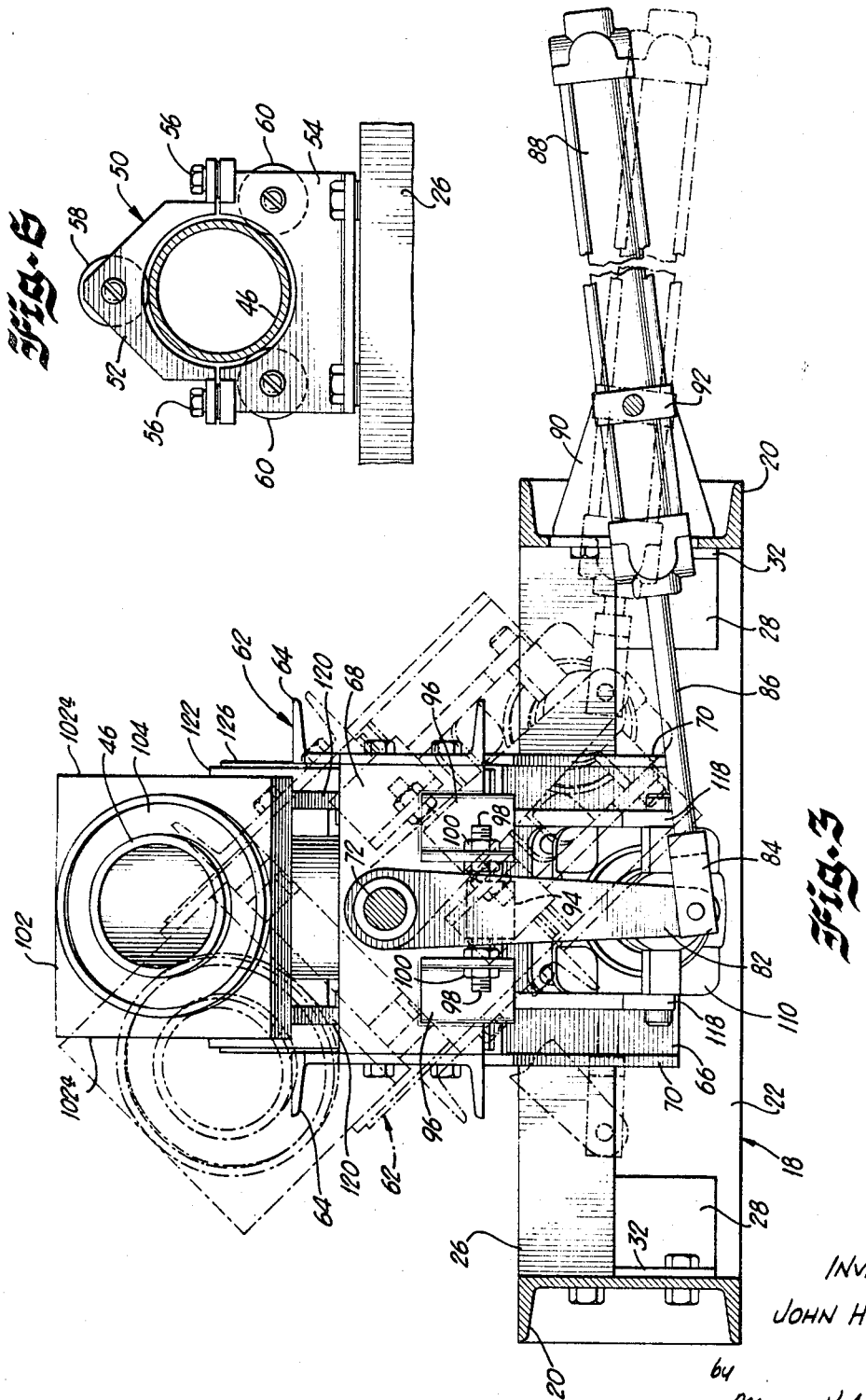

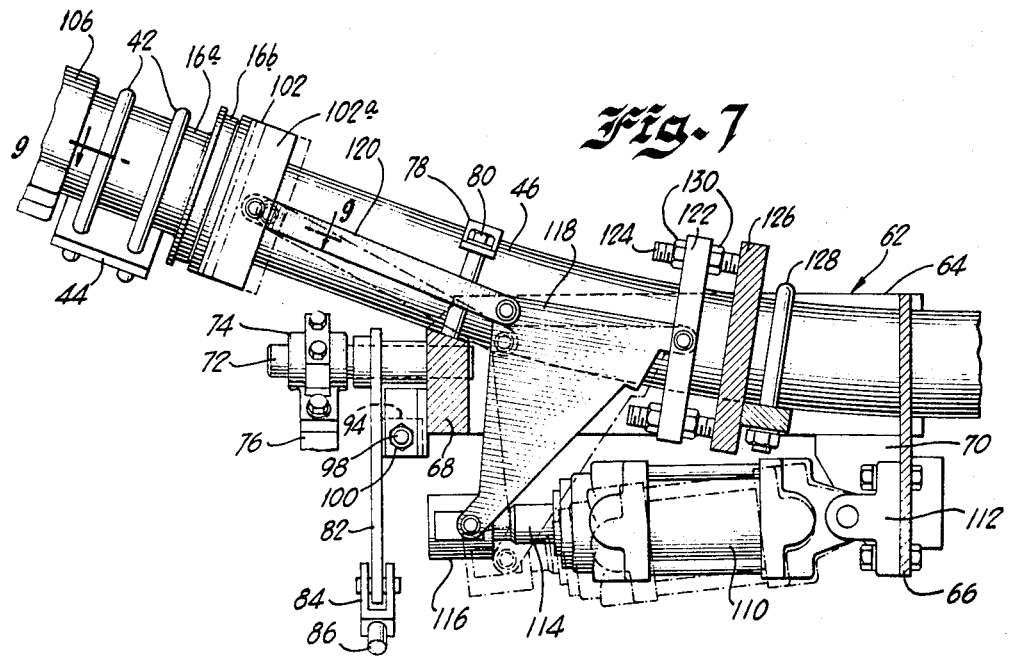
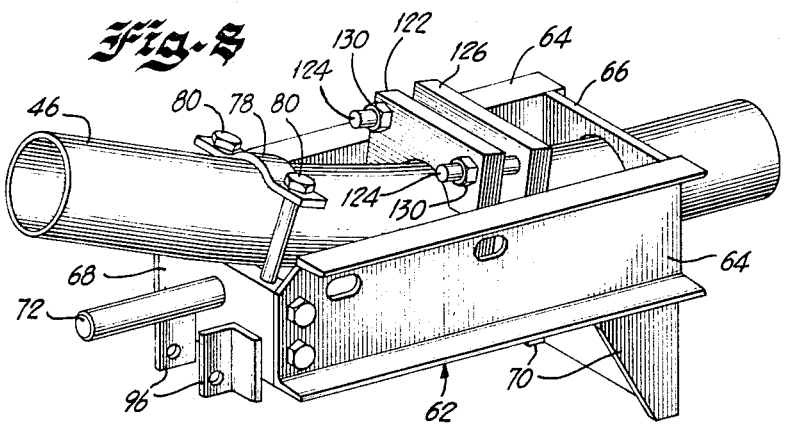
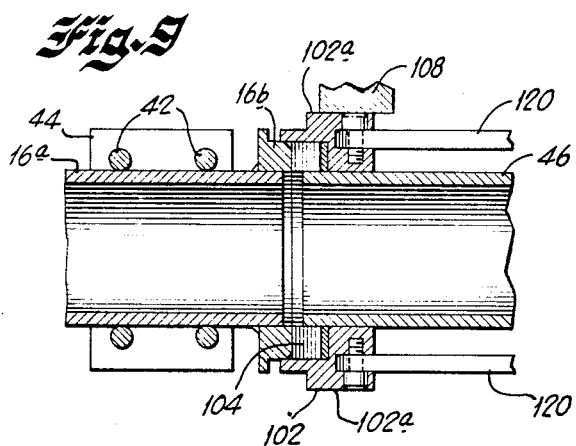

3,395,731
FLUID CONVEYOR SWITCH
John H. Kauffman, Crystal Lake, Ill., assignor, by mesne assignments, to National Engineering Company, Chicago, Ill., a corporation of Delaware
Filed June 7, 1965, Ser. No. 461,883
12 Claims. (Cl. 137—610)

ABSTRACT OF THE DISCLOSURE

A switching device for interconnecting a main fluid duct with a selected one of a plurality of branch ducts including, a curver tubular duct element having one end rotatively coupled to the end of the main fluid duct and an open opposite end adapted to communicate with said branch ducts. A support for mounting the curved duct element for pivotal movement about an axis centrally aligned with the rotatively coupled end thereof, the opposite end of the curved duct element being movable upon rotation thereof between a first position aligned with one of the branch ducts and a second position aligned with the other. An actuator for pivotally moving the duct element between the first and second aligned positions. Annular coupling means slidably mounted on the curved duct element for movement toward and away from the open end for coupling engagement between the curved duct element and a selective one of the branch ducts, and an actuator for moving the coupling into and out of coupling engagement with the selected branch duct.

---

The present invention relates to fluid conveying systems generally and, more particularly, to switching devices for switching fluid flow between a plurality of separate branch delivery tubes or ducts in pneumatic material delivery systems.

It is an object of the present invention to provide a new and improved switching device for fluid conveying systems to switch the flow of the material carrying fluid between a plurality of separate delivery tubes or ducts.

Another object of the present invention is the provision of a new and improved switching device of the type described having a gradually curved movable duct element for switching between a main fluid duct and selected separate branch ducts.

Another object of the invention is the provision of a new and improved switching device of the type described wherein the movable duct element is rotatably connected to a main fluid duct and is pivotally movable about a central axis extending through the main duct, between first and second positions wherein the duct element is aligned for connection to selected separate branch ducts.

Another object of the present invention is the provision of a new and improved switching device of the type described, including novel means for supporting and guiding the movable duct element for pivotal movement between different switching positions to insure proper alignment with the selected branch ducts.

Yet another object of the present invention is the provision of a new an improved switching device of the type described, including novel means selectively, sealingly connecting the movable duct element with the selected branch ducts to insure smooth flow when connected without leakage.

Still another object of the present invention is the provision of a new and improved switching device of the type described, including novel means for moving the duct element between selected switching positions.

A further object of the present invention is the provision of a new and improved switching device of the type described, including novel means for sealingly connecting the movable duct element to the branch ducts and locking the element in proper alignment therewith.

A further object of the present invention is the provision of a new and improved switching device of the type described, including means for adjusting the movement of the coupling means for sealingly connecting and locking the movable duct element to a selected branch duct.

Another object of the present invention is the provision of a new and improved switching device of the type described which is simple in operation and construction, economical to manufacture, and easy to install.

Briefly, the foregoing and other objects of the present invention are accomplished by the provision of a new and improved switching device for use in interconnecting a fluid duct with selected ones of a plurality of branch ducts comprising a gently curved movable duct element having one end rotatively coupled to the end of the fluid duct and an open opposite end adapted to be connected to a selected one of the branch ducts. The duct element is mounted for pivotal movement relative to the ducts to rotate about a central axis aligned with the end of the fluid duct between first and second positions wherein the open end of the duct element is aligned for connection with respective ones of the branch ducts, Actuating means are provided for selectively rotating the duct element between the first and second positions and coupling means movable toward and away from the open end of the duct element are provided for sealingly connecting the duct element to the selected branch duct after the duct element is moved into selected position. Actuating means are also provided for moving the coupling means into sealing and locking engagement with the selected branch duct and for unlocking the coupling means prior to movement of the duct element to another position for connection to a different branch duct.

For a better understanding of the present invention, reference should be had to the following detailed description taken in conjunction with the drawings, in which:

FIG. 1 is a top plan view of an air conveyor switch constructed in accordance with the present invention;

FIG. 2 is a sectional elevational view of the air conveyor switch of FIG. 1 taken substantially along the line 2—2 of FIG. 1;

FIG. 3 is a transverse cross-sectional view taken substantially along line 3—3 of FIG. 2;

FIG. 4 is a fragmentary sectional view taken substantially along line 4—4 of FIG. 2;

FIG. 5 is a fragmentary sectional view taken substantially along line 5—5 of FIG. 2;

FIG. 6 is a fragmentary sectional view taken substantially along line 6—6 of FIG. 2;

FIG. 7 is a fragmentary side elevational view taken on a tilted plane illustrating the switch in one of its operative positions connected with a selected branch delivery duct;

FIG. 8 is a fragmentary perspective view illustrating the movable duct element and cradle assembly of the conveyor switch of FIG. 1; and FIG. 9 is a fragmentary sectional view taken substantially along line 9—9 of FIG. 7.

Referring now to the drawings, a new and improved fluid conveyor switch assembly constructed in accordance with the features of the present invention is shown and referred to generally by the reference numeral 10. The switch assembly 10 is adapted to selectively interconnect material conveying fluid flow between a single main duct 12 and a selected one of a pair of branch ducts 14 and 16. The switch assembly 10 is supported upon a bed structure 18 formed with a pair of longitudinal side channels 20, a pair of opposite end channels 22, an intermediate cross channel 24 (FIG. 2) and an angle-shaped cross member 26. The end channels 22 are are secured to the side channels 20 by corner angle brackets 28, and the intermediate channel 24 is secured to the side channels 20 by corner brackets 30. The cross member 26 is secured to the side channels 20 by a pair of angle brackets 32 and is spaced between the intermediate channel 24 and one end channel 22, leaving a large opening in the central portion of the bed structure.

The main duct 12 is rigidly secured to the right-hand end channel 22 (FIG. 1) by means of a recessed support bracket 34 and U-bolt assembly 36. In order to secure the branch ducts 14 and 16 to the bed structure 18, a baseplate 38 is positioned on the left-hand portion (FIG. 1) of the bed structure and secured to the side channels 20, the intermediate channel 24, and the left-hand end channel 22. The plate 38 supports a pair of upstanding brackets 40 (FIG. 2) which provide supporting structure for the terminal ends of the separate branch ducts 14 and 16. The top edges of brackets 40 are slanted, as shown in FIG. 2, and the brackets are aligned longitudinally with their respective branch ducts 14 and 16 to provide the desired angular relation between the branch ducts and the central longitudinal axis of the main duct 12. The branch ducts are secured to their respective brackets 40 by means of U-bolts 42 which extend downwardly through supporting cross plates 44 attached to the top edges of the support brackets 40.

In order to interconnect the main duct 12 with either one of the branch ducts 14 and 16, a gently curved, movable duct element 46 is mounted for pivotal movement on the bed structure between selected positions wherein one or the other of the branch ducts is placed in direct communication with the main duct through the movable duct element 46. The right-hand end (FIG. 1) of the movable duct element 46 is rotatively coupled to the end of the main duct 12 by means of a rotating sealed coupling unit 48. The left-hand end of the duct element 46 is open and is adapted for connection to a selected one of the branch ducts 14 and 16 when in an aligned position therewith.

The duct element 46 is pivotally movable about a pivot axis coaxially aligned with the outlet of the main duct 12 and in order to reduce strain upon the coupling 48, an upstanding roller guide assembly 50 is mounted on the cross member 26 to support the right-hand portion of the duct element.

The roller guide assembly 50 includes a removable upper cap structure 52 and a lower base structure 54 which are secured together with cap screws 56. The upper cap structure 52 carries a single upper guide roller 58, and the lower base structure 54 carries a spaced pair of lower guide rollers 60 (FIG. 6). The rollers 58 and 60 bear inwardly against the rotatable duct element 46 and provide support for the duct element as it is rotated between selected positions. The cap screws 56 can be tightened or loosened to provide the necessary bearing pressure between the rollers of the guide assembly and the rotatable duct element.

Referring to FIG. 8, a supporting cradle structure 62 is secured to the rotatable duct element and includes a a pair of longitudinal side channels 64 joined at one end by a cross plate 66 and at the other end by an end block 68. The cross plate 66, which includes a circular aperture through which the duct element 46 extends, depends well below the duct element, and the lower portion of the plate 66 serves as a mounting base for a locking cylinder and is stiffened by a pair of gussets 70 attached to the lower edge of the side channels 64. A mounting shaft 72 extends outwardly from the end block 68 to support the left-hand end of the cradle assembly 62 and is journaled for rotation in a fixed bearing or pillow block 74 (FIG. 7) mounted on a spacer 76 extending upwardly from the plate 38 of the bed structure 18. The upper surface of the end block 68 is recessed slightly to support and center the duct element 46 in the cradle assembly, and the duct element is secured to the end block with an upper clamp 78 and a pair of clamping bolts 80 threaded into the block.

The mounting shaft 72 is coaxial with the central axis of the main delivery duct 12 and permits pivotal movement of the duct element 46 between selected positions to interconnect the main duct 12 with a selected one of the branch ducts 14 and 16.

In order to pivotally move the duct element 46 and cradle assembly 62 between the selected positions, a downwardly extending actuating arm 82 is connected to the mounting shaft 72. The lower end of the arm 82, as shown best in FIG. 3, is pivotally connected to a yoke 84 on the outer end of a piston rod 86 actuated by a hydraulic or pneumatic cylinder 88. The actuating cylinder is supported from one of the side channels 20 by a pair of outwardly extending support brackets 90 and is pivotally mounted on the support brackets by means of a yoke assembly 92 secured around the body of the cylinder, intermediate its ends.

In FIGS. 1 and 2, and in full lines in FIG. 3, the movable duct element 46 and cradle assembly 62 are illustrated in an intermediate position wherein the open end of the duct element is not in alignment with either of the branch ducts 14 or 16. When the cylinder 88 is energized with fluid to retract the rod 86, the cylinder will pivot to the position shown in dotted lines of FIG. 3, and the duct element and cradle assembly are pivoted into an aligned position wherein the open end of the duct element is in alignment with the open end of the branch duct 16. When the cylinder 88 is supplied with fluid to move the rod 86 outwardly thereof, the duct element and cradle assembly pivot in an opposite direction to an opposite selected position wherein the open end of the duct element is aligned with the branch duct 14.

In order to accurately align the open end of the duct element 46 with the branch ducts 14 and 16, the actuating arm 82 includes a centering lug 94 positioned to extend between a pair of spaced-apart stop brackets 96, secured to (FIG. 8) the forward face of the end block 68. A threaded adjusting pin 98 extends outwardly from opposite sides of the lug 94 through apertures in the stop brackets 96, and a plurality of adjusting nuts 100 (FIG. 3) are provided to accurately adjust the angular position of the actuating arm 82 in respect to the cradle assembly 62.

In order to sealingly couple the open end of the duct element 46 to the ends of the respective branch ducts 14 and 16, an annular coupling block 102 is mounted on the duct element 46 adjacent the open end thereof for axial movement toward and away from the open end of the duct element between a coupled position and an uncoupled position, as illustrated in FIGS. 7 and 9. The coupling block 102 is formed with an outwardly facing annular recess for containing a resilient packing gasket 104 encircling the duct element and providing a seal between the outer wall thereof and the coupling block.

Because repeated coupling and uncoupling between the coupling block 102 and the ends of the branch ducts cause considerable wear on the ducts, the ducts are constructed with replaceable end sections 14a and 16a, and these sections are connected to the main portion of the respective branch ducts with removable couplings 106. The couplings 106 are positioned between the pairs of the U-bolts 42 on each branch duct, and each replaceable section is held in place by a single pair of U-bolts. The replaceable end sections 14a and 16a include annular coupling flanges 14b and 16b, respectively, having outer faces adapted to bear against the sealing gasket 104 carried in the movable coupling block 102. FIG. 9 illustrates the branch duct 16 and movable duct element 46 in coupled engagement with each other and the gasket 104 in sealed engagement against the outer face of the flange 16b. The flange 16b extends slightly into the recess of the coupling block 102, locking the ducts in alignment with each other, but the opposing ends of the ducts are spaced apart to permit free movement of the duct element 46 when the coupling block is retracted out of coupling engagement.

In order to cushion the shock of the duct element 46 as it moves into an aligned position with one or the other branch ducts, a pair of bumper assemblies 108 (FIG. 1) are positioned adjacent and outwardly of the open ends of the respective branch duct end flanges 14b and 16b. Each bumper assembly includes a support member of metal and a resilient bumper having a flat face adapted to bear against flatted edge surfaces 102a formed on opposite sides of the coupling block 102. The bumper assemblies also aid in pre-aligning the duct element 46 with the respective branch ducts before coupling engagement is made by the movement of the coupling block 102.

In order to move the coupling block 102 toward and away from the open end of the movable duct element 46 to make coupling engagement with the respective branch ducts, a pneumatic or hydraulic coupling actuator cylinder 110 is mounted on the cradle assembly 62 in a position below the duct element 46. One end of the cylinder 110 is pivotally mounted by a support bracket 112 attached to the cross plate 66, and the cylinder includes a movable piston rod 114 having a slotted yoke 116 on the outer end thereof connected to the lower corners of a pair of triangularly shaped, toggle actuators 118 disposed on opposite sides of the duct element 46 between the side channels 64 of the cradle assembly. Upper forward corners of the toggle actuators 118 are connected to the rearward ends of a pair of toggle arms 120 extending generally in a longitudinal direction along the duct element 46. The toggle actuators 118 are supported for pivotal movement in relation to the duct element by an adjustable base bracket 122 carried on the duct element between the side channels 64 of the cradle assembly. The base bracket 122 is movable longitudinally on the duct element between selected positions to provide for adjustment of the position and movement of the coupling block 102 as it is moved into and out of coupling engagement with the respective branch ducts. By moving the base bracket 122 toward the open end of the duct element 46, compression of the gasket 104 during coupling engagement is increased, and the movement of the toggle arms 120 can be effected to provide movement past a dead-center position for positively locking the coupling member 102 in coupling engagement. The base bracket is supported by four adjusting bolts 124 which extend outwardly from a fixed clamping bracket 126 secured to the duct element 46 by a U-bolt assembly 128. The clamping bracket 126 is tightly secured to the duct element 46, once the U-bolt assembly 128 is tightened and movement of the bracket 122 relative thereto is accomplished by loosening and tightening a pair of nuts 130 on each of the bolts 124. As the gasket 104 in the coupling block 102 wears during use, it may be necessary to move the bracket 22 forwardly to insure tight sealing between the movable coupling 102 and the coupling flanges 14b and 16b of the respective branch ducts.

FIGS. 7 and 9 illustrate the conveyor switch assembly 10 in one selected coupling position, wherein the movable duct element 46 is coupled to the branch duct 16. When it is desired to actuate the switch assembly to interconnect the other branch duct 14 with the main duct 12, the cylinder 110 is actuated with fluid to retract the piston rod 114. Rod retraction causes the toggle actuators 118 to pivot in counterclockwise direction until the toggle arms 120 pass dead-center and then move the coupling block 102 to a retracted position out of coupling engagement with the coupling flange 16b. Because a pair of toggle arms 120 are disposed on opposite sides of the duct element 46, the coupling block 102 does not bind during movement but moves smoothly back to the retracted position, as indicated in dotted lines in FIG. 7. After retraction of the coupling block 102, the cylinder 88 is actuated to extend its piston rod 86 and pivot the duct element 46 and cradle assembly 62 (FIG. 3) to align the open end of the duct element with the other branch duct 14.

Once in aligned position, the cylinder 110 is actuated to extend its rod 114, moving the toggle actuators 118 in a clockwise direction to force the coupling block 102 forwardly on the duct element into coupling engagement with the branch duct 14. As the coupling block 102 moves into coupling position, the toggle arms 120 move past dead-center alignment between the forward end of the toggle arms and the rearward pivot point of the toggle actuators 118 on the bracket 122. This action firmly locks the coupling block 102 in engagement with the flange 14b and a tight seal is obtained between the movable duct element 46 and branch duct 14. Because the duct element 46 is gently curved and is pivotally moved for switching between the respective branch ducts, the material carrying fluid flow through the system is smooth and nonturbulent. This provides a distinct advantage over other switching units wherein the movable switching element is moved laterally rather than pivotally, as in the present invention. Because the coupling actuating cylinder 110 is supported in a movable cradle assembly 62 and is movable with the duct element 46, only one such actuating cylinder is required rather than a cylinder for each branch duct, reducing the cost of the unit appreciably.

While there has been illustrated and described a single embodiment of the present invention, it will be appreciated that numerous changes and modifications will occur to those skilled in the art, and it is intended in the appended claim to cover all those changes and modifications which fall within the true spirit and scope of the present invention.

What is claimed as new and desired to be secured by Letters Patent of the United States is:

1. A switching device for use in interconnecting a fluid duct with a selected one of a plurality of branch ducts comprising a curved tubular duct element having one end rotatively coupled to the end of said fluid duct and an open opposite end adapted for communication with either of said branch ducts, support means pivotally mounting said duct element for rotation about an axis centrally positioned with respect to said one end between a first position wherein said open end is aligned with one of said branch ducts and a second position wherein said open end is aligned with the other of said branch ducts, first actuating means for pivotally moving said duct element between said first and second positions, annular coupling means slidably mounted on said curved duct element and movable toward and away from said open end thereof for selective coupling engagement between said curved duct element and aligned end a selected one of said branch ducts and second actuating means for selectively moving said coupling means into and out of coupling engagement.

2. Apparatus as defined in claim 1 wherein said support means includes a guide assembly having a plurality of spaced rollers arranged to supportingly engage the outer surface of said duct element closely adjacent said one end.

3. Apparatus as defined in claim 2 wherein said support means includes shaft means having one end secured to said duct element and extending outwardly away from said one end thereof in axial alignment therewith and fixed bearing means for supporting the other end of said shaft means.

4. Apparatus as defined in claim 1 including a sealed rotary coupling interconnecting said one end of said duct element and the end of said fluid duct.

5. A switching device for use in interconnecting a fluid duct with a selected one of a plurality of branch ducts comprising a curved tubular duct element having one end rotatively coupled to the end of said fluid duct and an open opposite end adapted for communication with either of said branch ducts, support means pivotally mounting said duct element for rotation about an axis centrally positioned with respect to said one end between a first position wherein said open end is aligned with one of said branch ducts and a second position wherein said open end is aligned with the other of said branch ducts, said support means including shaft means having one end secured to said duct element and extending outwardly therefrom in coaxial alignment with said axis, first actuating means for pivotally moving said duct element between said first and second positions, said first actuating means including an actuating arm having one end secured to said shaft means and extending outwardly therefrom and a longitudinally extendable actuator secured to said arm and pivotally mounted at a fixed position in relation to said fluid duct, coupling means mounted for reciprocal sliding movement on said duct element movable toward and away from said open end thereof for coupling engagement between said duct element and the end of a selected one of said branch ducts and second actuating means for selectively moving said coupling means into and out of coupling engagement 6. Apparatus as defined in claim 5 wherein said actuator comprises fluid cylinder and piston means movable relative to one another between extended and contracted positions for moving said arm to pivot said duct element between said first and second positions.

7. Apparatus as defined in claim 5 wherein said coupling means includes a flanged coupling mounted for sliding movement on said duct element adjacent said open end between a branch duct engaging position and a retracted position inwardly of said open end of said duct element.

8. Apparatus as defined in claim 7 wherein said second actuating means includes a longitudinally extendable actuator mounted on said duct element and including an operative end connected to move said coupling between said engaging and retracted position.

9. A switching device for use in interconnecting a fluid duct with a selected one of a plurality of branch ducts comprising a curved tubular duct element having one end rotatively coupled to the end of said fluid duct and an open opposite end adapted for communication with a selected one of said branch ducts, support means pivotally mounting said duct element for rotation about an axis centrally positioned with respect to said one end between a first position wherein said open end is aligned with one of said branch ducts and a second position wherein said open end is aligned with the other of said branch ducts, first actuating means for pivotally moving said duct element between said first and second positions, coupling means mounted for reciprocal sliding movement on said tubular duct element and movable toward and away from said open end of said duct element for coupling engagement between said element and the ends of said branch ducts, said coupling means including an open ended flanged coupling slidably mounted on said duct element between a retracted position inwardly from the open end of said duct element and a branch duct engaging position wherein said open end of said coupling is in sealed coupling engagement with the end of a branch duct and second actuating means for selectively moving said coupling means into and out of coupling engagement.

10. Apparatus as defined in claim 9 wherein said second actuating means includes a longitudinally extendable actuator mounted on said duct element and linkage means interconnecting said coupling and said actuator to move the coupling to said engaged position when said actuator is extended and to said retracted position when said actuator is contracted.

11. Apparatus as defined in claim 10 wherein the actuator of said second actuating means comprises fluid cylinder and piston means, said actuator having one end pivotally mounted on said duct element adjacent said rotatively coupled end and having an operative end extending outwardly therefrom for connection to said linkage means, said linkage means including a pair of arms disposed on opposite sides of said duct element having forward ends pivotally connected to said coupling at diametrically opposed pivot points thereon, a pair of toggle elements on opposite sides of said duct element, each of said toggle elements including a first connecting point thereon pivotally connected to the operative end of said actuator, a second connecting point thereon spaced from the first point and pivotally connected to one of said arms and a third connecting point thereon spaced from said first and second points for mounting said toggle on said duct element, and mounting means carried on said duct element and pivotally connected with the third points of said toggle elements, and mounting means movable along said duct element between selectively adjustable positions for adjusting the amount of movement of said coupling in response to movement of said actuator between said extended and retracted position.

12. Apparatus as defined in claim 9 wherein said coupling includes resilient sealing means carried in the open end thereof and compressible into sealing engagement between said duct element and the end of a selected one of said branch ducts when said coupling is moved into coupling engagement therewith.

References Cited

UNITED STATES PATENTS

| | | | |
|---|---|---|---|
| 850,762 | 4/1907 | Kolla | 137—610 |
| 2,586,144 | 2/1952 | Benoit | 137—610 X |
| 2,900,200 | 8/1959 | Umstadter | 285—369 X |
| 2,907,242 | 10/1959 | Chakroff. | |
| 3,089,515 | 5/1963 | Bochan | 137—610 |
| 3,115,157 | 12/1963 | Coats | 137—610 X |
| 3,132,669 | 5/1964 | Feldsted | 137—610 X |
| 3,154,326 | 10/1964 | Anding | 285—9 |
| 3,174,806 | 3/1965 | Barper et al. | 137—610 X |
| 3,298,680 | 1/1967 | Jablin | 285—9 X |

FOREIGN PATENTS

| | | |
|---|---|---|
| 482,158 | 9/1929 | Germany. |

SAMUEL SCOTT, *Primary Examiner.*

UNITED STATES PATENT OFFICE
CERTIFICATE OF CORRECTION

Patent No. 3,395,731                        August 6, 1968

John H. Kauffman

It is certified that error appears in the above identified patent and that said Letters Patent are hereby corrected as shown below:

Column 6, line 50, "and aligned end a" should read -- and an aligned end of a --.

Signed and sealed this 23rd day of December 1969.

(SEAL)
Attest:

Edward M. Fletcher, Jr.                  WILLIAM E. SCHUYLER, JR.
Attesting Officer                              Commissioner of Patents